(12) United States Patent
Whately et al.

(10) Patent No.: US 11,403,172 B2
(45) Date of Patent: Aug. 2, 2022

(54) METHODS FOR ERROR DETECTION AND CORRECTION AND CORRESPONDING SYSTEMS AND DEVICES FOR THE SAME

(71) Applicant: Cypress Semiconductor Corporation, San Jose, CA (US)

(72) Inventors: Morgan Andrew Whately, San Francisco, CA (US); Cliff Zitlaw, San Jose, CA (US)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 162 days.

(21) Appl. No.: 16/826,998

(22) Filed: Mar. 23, 2020

(65) Prior Publication Data

US 2021/0042189 A1 Feb. 11, 2021

Related U.S. Application Data

(60) Provisional application No. 62/882,926, filed on Aug. 5, 2019.

(51) Int. Cl.
| | |
|---|---|
| *H03M 13/00* | (2006.01) |
| *G06F 11/10* | (2006.01) |
| *G06F 13/42* | (2006.01) |
| *G06F 13/16* | (2006.01) |
| *G06F 11/30* | (2006.01) |

(52) U.S. Cl.
CPC ...... *G06F 11/1068* (2013.01); *G06F 11/1044* (2013.01); *G06F 11/3037* (2013.01); *G06F 13/1689* (2013.01); *G06F 13/4234* (2013.01)

(58) Field of Classification Search
CPC ............. G06F 11/1068; G06F 11/1044; G06F 11/3037; G06F 13/4234; G06F 13/1689
See application file for complete search history.

(56) References Cited

U.S. PATENT DOCUMENTS

| | | | |
|---|---|---|---|
| 8,166,217 B2 | 4/2012 | White et al. | |
| 10,824,506 B1* | 11/2020 | Avron | ................... G06F 3/0608 |
| 2003/0126356 A1 | 7/2003 | Gustavson et al. | |

(Continued)

FOREIGN PATENT DOCUMENTS

WO  2014084855 A1  6/2014

OTHER PUBLICATIONS

International Search Report for International Application No. PCT/US2020/043133 dated Sep. 30, 2020; 2 pages.

(Continued)

*Primary Examiner* — Samir W Rizk

(57) ABSTRACT

A method can include, in response to receiving a read request at a memory controller, sending a read command and address values on a command address bus in synchronism with a clock. In response to the read command, receiving an uninterrupted burst of read data values on at least one parallel data bus, the burst of read data values having double date rate with respect to the clock, and receiving error correction code (ECC) values for the read data values in response to the same read command, the ECC values not being included in the burst of read data values being output on non-ECC input/outputs (I/Os); wherein the non-ECC I/Os are I/Os not assigned to ECC data according to a preexisting standards organization. Corresponding systems and devices are disclosed.

16 Claims, 19 Drawing Sheets

(56) References Cited

U.S. PATENT DOCUMENTS

| | | |
|---|---|---|
| 2006/0224789 A1 | 10/2006 | Cho et al. |
| 2012/0246544 A1 | 9/2012 | Resnick et al. |
| 2014/0006730 A1 | 1/2014 | Zain et al. |
| 2016/0196181 A1 | 7/2016 | Troia |
| 2018/0219562 A1* | 8/2018 | Lee .................... G06F 11/1012 |

OTHER PUBLICATIONS

Written Opinion of the International Searching Authority for International Application No. PCT/US2020/043133 dated Sep. 30, 2020; 5 pages.

* cited by examiner

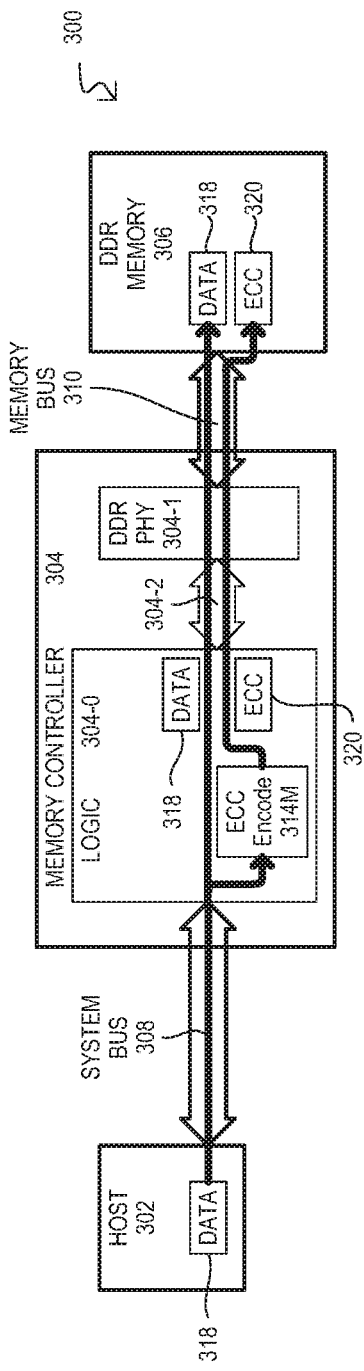
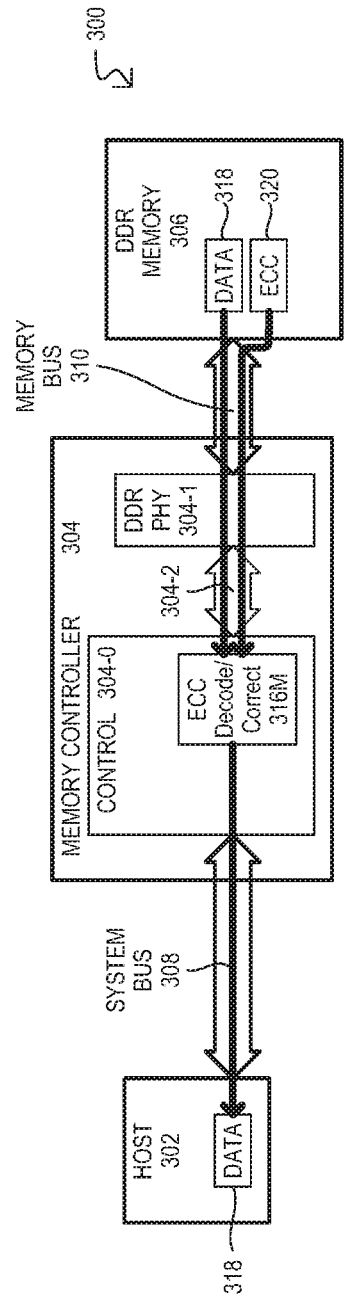
FIG. 3A
FIG. 3B (BACKGROUND)

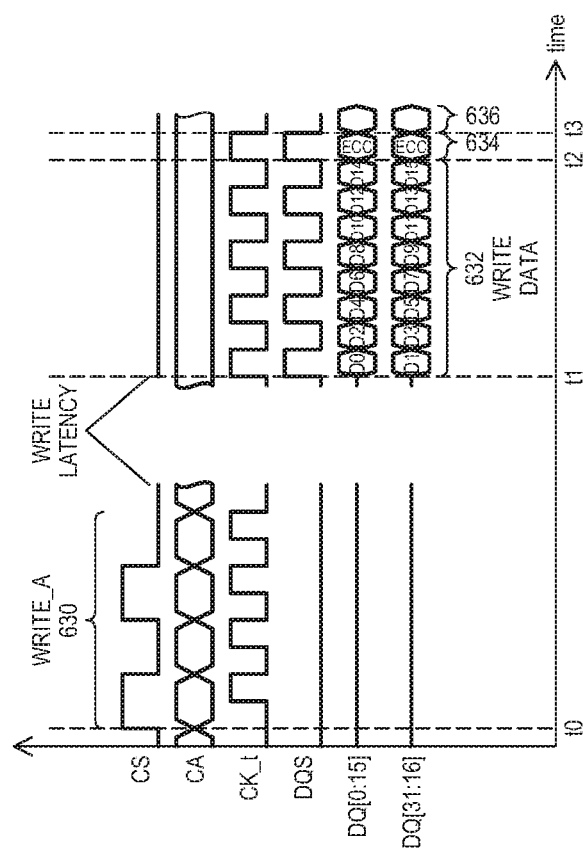

| COMPARED FEATURES | Read Data + Read ECC | Increase I/O Width x16 -> x18 | Append ECC to Read Data | Repurpose DBi/DM as ECC |
|---|---|---|---|---|
| Bandwidth (x16 800MHz) | 1.6 GB/s | 3.2 GB/s | 2.56 GB/s | 3.2 GB/s |
| Modify PHY? | No | Yes | No | No |
| Modify MC? | No | Yes | Yes | Yes |
| Modify Training? | No | Yes | No | No |
| ECC per 256b | 10+ | 32 | Up to 64 | 32 |
| Memory Density | 256 Mb+ | 288 Mb | 256 Mb+ | 288 Mb |

FIG. 8

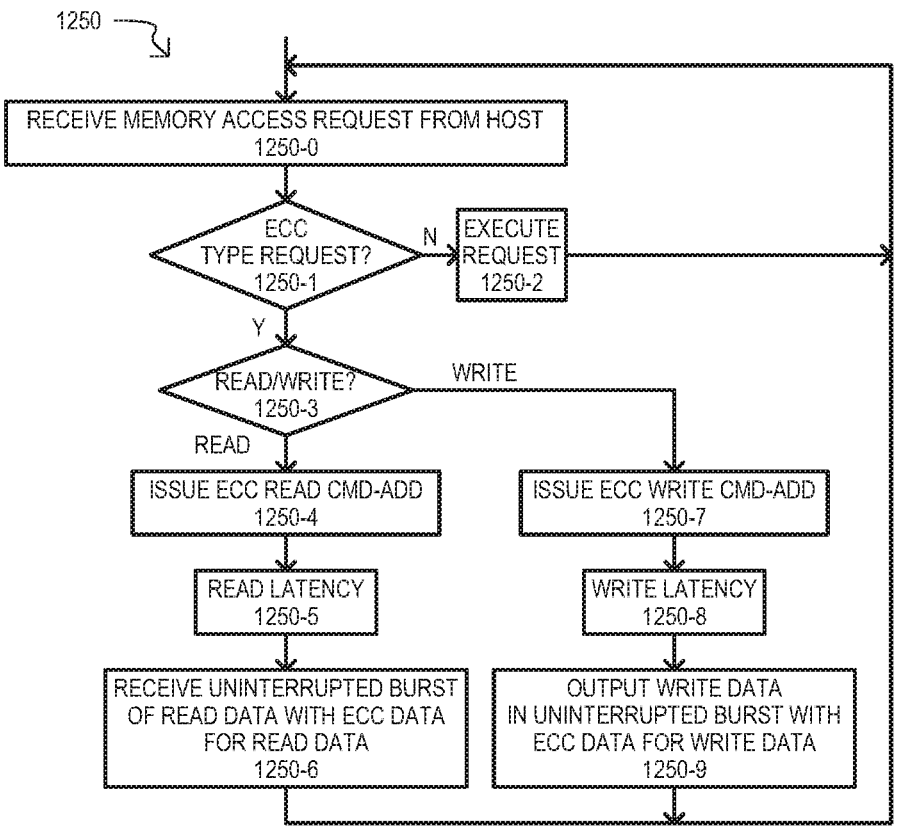
FIG. 12
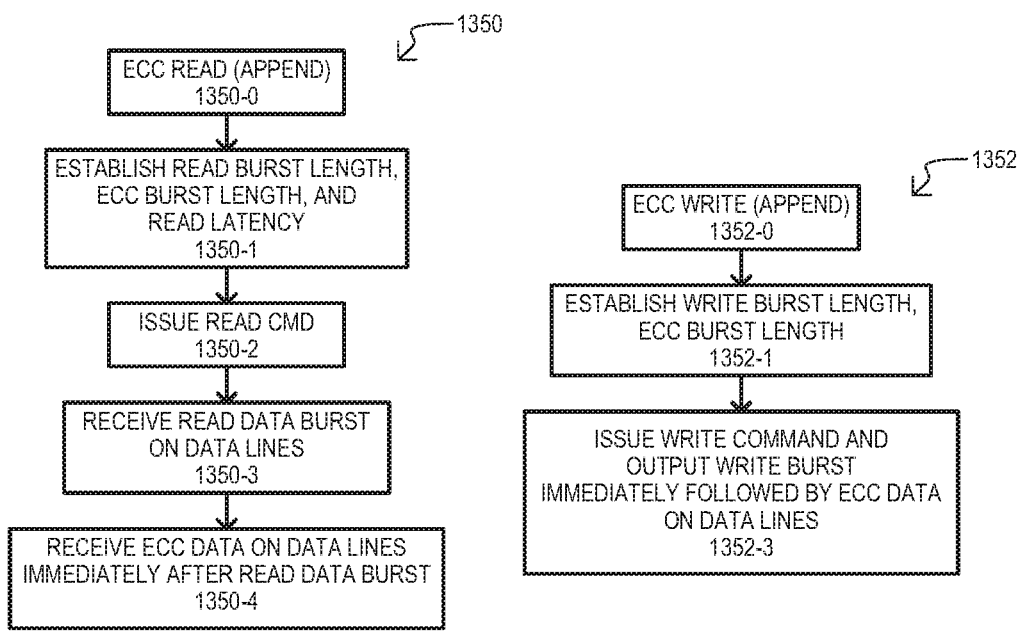
FIG. 13A
FIG. 13B

METHODS FOR ERROR DETECTION AND CORRECTION AND CORRESPONDING SYSTEMS AND DEVICES FOR THE SAME

RELATED APPLICATIONS

This application claims the benefit of U.S. provisional patent application having Ser. No. 62/882,926, filed on Aug. 5, 2019, the contents of which are incorporated by reference herein.

TECHNICAL FIELD

The present disclosure relates generally to systems that store data in memory devices, and more particularly to systems having memory controllers that store data with corresponding error correction codes in memory devices.

BACKGROUND

Error detection and correction can help ensure the integrity of data as it is transmitted and/or stored between different locations. Conventional approaches are directed to implementing error correction and detection at a component level. A host device in communication with other devices can include error detection codes (e.g., CRC) with its communications to detect errors and then request retransmission of a message.

Many storage devices can employ error correction codes (ECC) for the detection and correction of data errors. For example, ECC DRAM memory can dedicate bus lines for ECC data in addition to data lines. One or more integrated circuits can be added to store ECC data. Further, error correction circuits can be included which use ECC data to perform error detection, and if an error is detected, error correction. Mass storage devices, such as NAND flash memory, can often suffer from data integrity problems, and so can transfer ECC codes with data values. A drawback to ECC memory can be the added cost of increased components and drop in performance as ECC operations can add to overall data throughput.

BRIEF DESCRIPTION OF THE DRAWINGS

FIGS. 3A and 3B are block diagrams of a system with end-to-end error detection and correction according to a further embodiment.

FIG. 6B is a timing diagram showing a write operation that appends ECC values to parallel write data bursts according to an embodiment.

FIG. 8 is a table comparing various read operations according to embodiments with conventional read operations.

FIG. 12 is a flow diagram of a method according to an embodiment.

FIGS. 13A and 13B are flow diagrams of read and write methods for appending ECC values to data bursts according to embodiments.

DETAILED DESCRIPTION

Figure 1A:
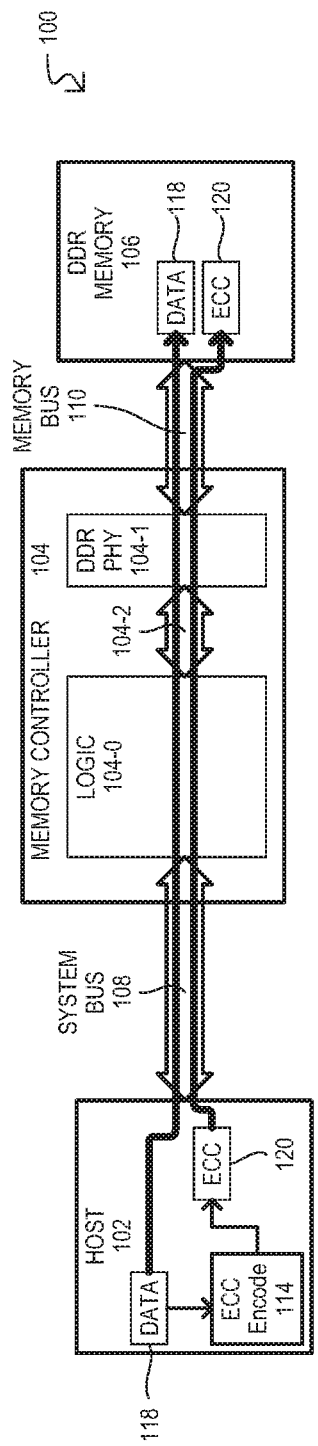
FIGS. 1A and 1B are block diagrams of a system with end-to-end error detection and correction according to an embodiment.

According to embodiments, error detection and correction can be provided in an "end-to-end" manner from a host device to a memory device by including the transmission of error correction code (ECC) values through an intervening memory controller (MC). Such an arrangement can eliminate the need for multiple ECC schemes at the various component levels and/or provide a highly robust data path, where ECC operations can occur at any of various stages.

In some embodiments, a host device can output data and ECC values (request a write operation), and such values can be written by a MC into a memory device. A host device can then retrieve the data and ECC values (request a read operation), the memory controller can read the data and ECC values from the memory device. The host device can then execute error detection, and if necessary correction, operations (referred to herein as ECC operations) on the retrieved data. Optionally, a MC can perform ECC operations on the data ECC values as received from the host device and/or as received from the memory device.

In some embodiments, ECC values can be appended to bursts of corresponding data values.

In some embodiments, ECC values can be transmitted in parallel to bursts of corresponding data values on re-tasked input/outputs (I/Os) (e.g., data bus inversion (DBI) or data mask (DM) I/Os).

In the various embodiments below, like items are referred to by the same reference characters, but with the leading digit(s) corresponding to the figure number.

Figure 1B:
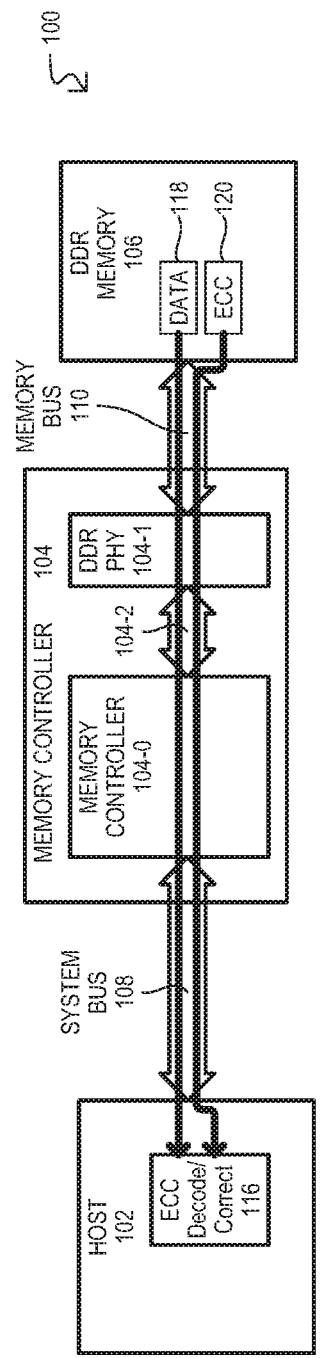

FIGS. 1A and 1B are block diagrams of a system 100 according to an embodiment. FIGS. 1A and 1B show a host device 102, a MC 104, and a memory device 106. A host device 102 can be connected to a MC 104 by a system bus 108. A MC 104 can be connected to memory device 106 by a memory bus 110. A memory bus 110 can include a parallel data bus that transfers multi-bit data values in bursts, at a double data rate (DDR). A DDR can transmit data values on the data bus in synchronism with the rising and falling edges of a clock signal. Command and address values may be transmitted at a single data rate (e.g., in synchronism with the rising edge of a clock signal).

FIG. 1A shows a data store operation according to an embodiment. A host device 102 can have data values 118 for storage. The host device 102 can include an ECC encoding function 114 which can generate ECC values 120 corresponding to the data values 118. An ECC encoding function 114 can include any suitable ECC encoding function, and in some embodiments can generate a block ECC code for predetermined amount of data bits. In one embodiment, ECC encoding function 114 can generate an 8-bit ECC code for every 64-bits of data.

A host device 102 can request the data values 120 be stored, by sending a request (not shown), address (not shown) along with the data values and corresponding ECC codes (118/120) to MC 104. Within MC 104, a logic section 104-0 can order the data/ECC (118/120) for transmission together in a same write operation. Further, logic section 104-0 can generate the appropriate signal values for a write command and write address. A physical layer interface (PHY) 104-1 of the MC 104 can transmit command (e.g., write), address (e.g., write address), data values (e.g., write data), and ECC values in a single write operation that will write the data values and ECC values into memory device 106. In some embodiments, PHY 104-1 can be a DDR PHY 104-1.

According to embodiments, data values 118 can be transferred to memory device 110 by MC 104 in an uninterrupted sequential burst of data values over a bi-directional multi-bit data bus. The data values can be considered uninterrupted in that data values are sent on consecutive half clock cycles, and do not include any ECC values 120. ECC values 120 are transmitted with the data values 118. ECC values 120 can be transmitted in any suitable way that does not interfere with the data burst. In some embodiments, ECC values 120 can be appended to the end of the data value burst, for an extended burst of data followed by ECC values. In other embodiments, ECC values 120 can be transmitted in parallel with data values on re-tasked I/Os. Re-tasked I/Os can be I/Os present on MC 104 according to a predetermined standard that are not intended for ECC data. Such predetermined standards can include, but are not limited to any of: DDR, DD2, DD3, DD4, LPDDR4, and future DDR standards.

FIG. 1B shows a data retrieval operation according to an embodiment. A host device 118 can request the data values 120 stored by memory device 106 by sending a request (not shown) and address (not shown) to MC 104. Within MC 104, a logic section 104-0 can generate the appropriate signal values for a read command and read address. A physical layer interface (PHY) 104-1 of the MC 104 can transmit command (e.g., read) and address (e.g., read address) values.

In response to the read command, data values and corresponding ECC codes (118/120) can be transferred from memory device to MC 104. According to embodiments, data values 118 from memory device 106 can be transferred to MC 104 in an uninterrupted, sequential burst of data values over a bi-directional multi-bit data bus. ECC values 120 can be transmitted with the data values 118. ECC values 120 can be transmitted in any suitable way that does not interfere with the data burst, as described herein or equivalents.

Within MC 104, PHY 104-1 can capture the data/ECC values (118/120) from memory device 106 and provide them to logic section 104-0. Logic section 104-0 can transfer the data/ECC values (118/120) over the system bus 108 to the host device 102.

Within host device 102, a ECC decode/correct function 116 can execute ECC operations on the data values 118 with the corresponding ECC codes 120.

Figure 2A:
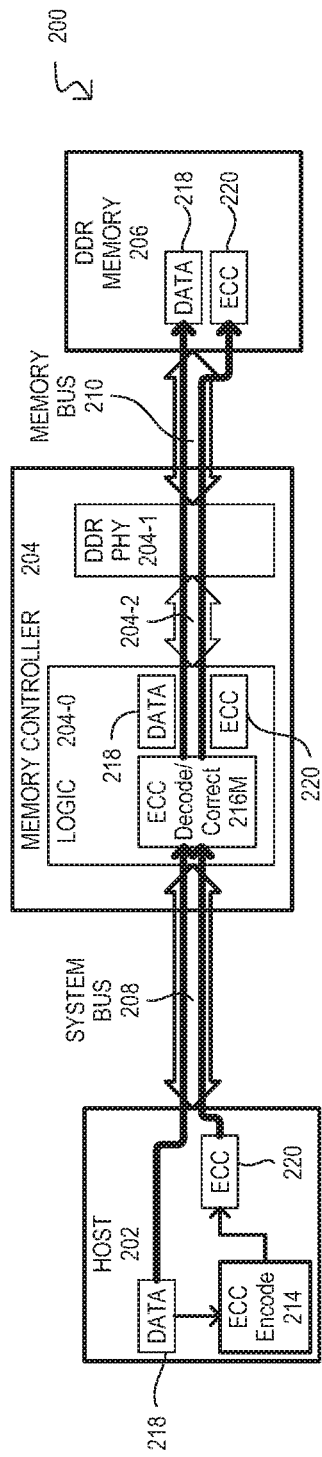
FIGS. 2A and 2B are block diagrams of a system with end-to-end error detection and correction according to another embodiment.
Figure 2B:
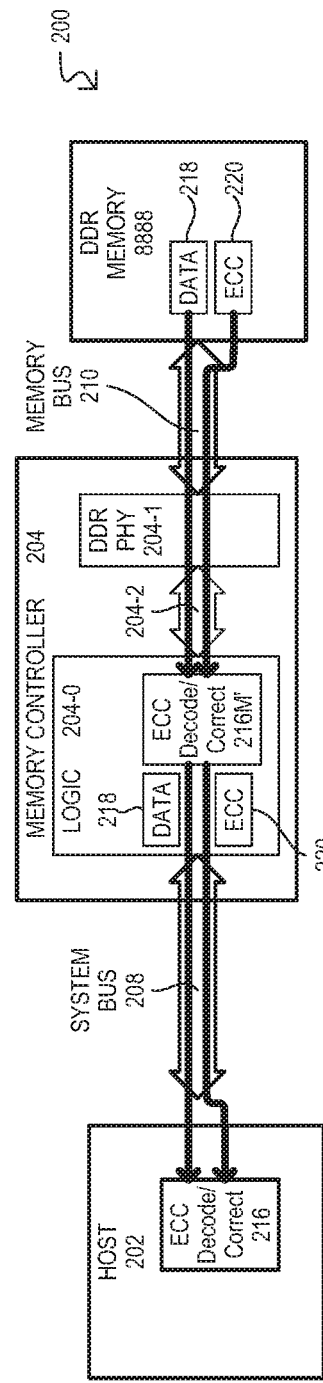

FIGS. 2A and 2B are block diagrams of a system 200 according to another embodiment. FIGS. 2A and 2B show a system with items like those of FIGS. 1A and 1B, and such like items can have the structures and be subject to the same variations as noted for FIGS. 1A and 1B.

Referring to FIG. 2A, a system 200 can differ from that of FIGS. 1A/B in that a memory controller 204 logic section 204-0 can include ECC circuit 216M. ECC circuit 216M can receive data and ECC values 218/220 from a host device 202 and perform ECC operations with such values. As a result, any errors in data resulting from the transfer of data from the host device 202 (e.g., over the system bus 208) can be corrected before such data is written into memory device 206 by MC 204.

Referring to FIG. 2B, in addition or alternatively, a system 200 can differ from that of FIGS. 1A/B in that a memory controller 204 logic section 204-0 can include ECC circuit 216M'. ECC circuit 216M' can receive data and ECC values 218/220 from memory device 208, via a PHY 204-1, and perform ECC operations with such values. As a result, any errors in data resulting from the transfer of data from memory device 206 (e.g., over the memory bus 210) can be corrected before such data is sent to the host device 202.

FIGS. 3A and 3B are block diagrams of a system 300 according to another embodiment. FIGS. 3A and 3B show a system with items like those of FIGS. 1A and 1B, and such like items can have the structures and be subject to the same variations as noted for FIGS. 1A and 1B.

Referring to FIG. 3A, a system 300 can differ from that of FIGS. 1A/B in that a MC 204 logic section 304-0 can include ECC circuit 314M. ECC circuit 314M can receive data values 318 from a host device 302 and generate ECC values 320 from such data values 318. The data values 318 and corresponding ECC values 320 can then be written into memory device 306 according to any of the ways described herein, or equivalents. In such an arrangement, a host device 302 may not have to generate ECC values.

Referring to FIG. 3B, a system 300 can further from that of FIGS. 1A/B in that a MC 304 logic section 304-0 can include ECC circuit 316M'. ECC circuit 316M' can receive data and ECC values 318/320 from memory device 308, via a PHY 304-1, and perform ECC operations with such values. Resulting data values 318 can be sent to the host device 302. ECC values 320 may not be sent to the host device 302.

Figure 4:
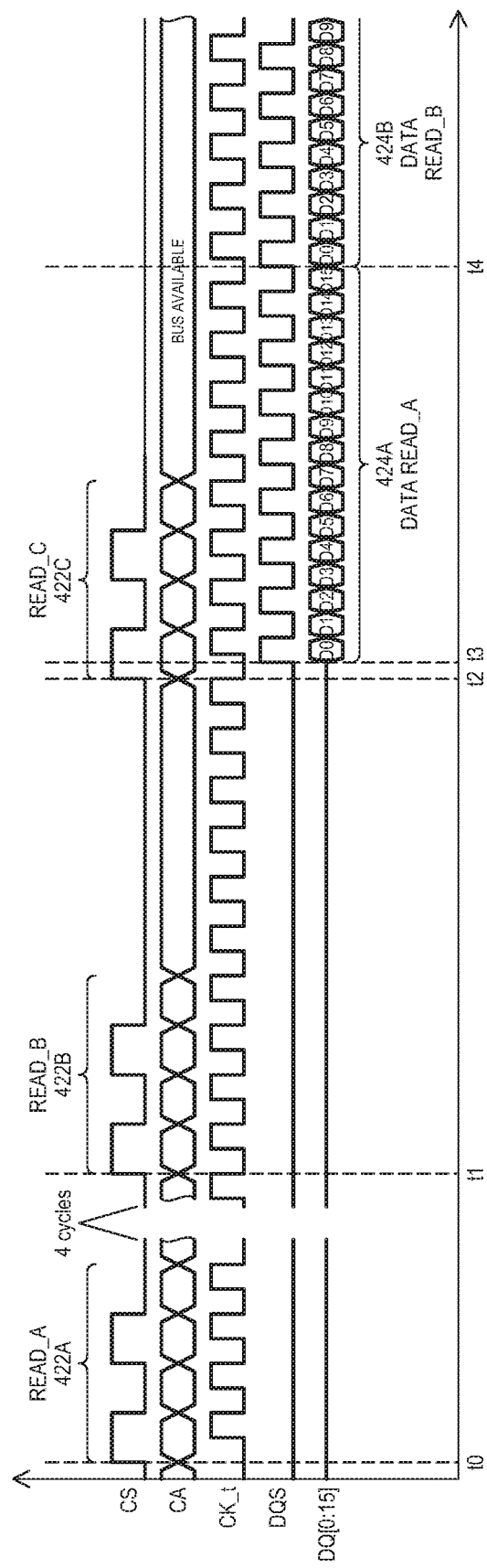
FIG. 4 is a timing diagram showing a conventional read operations of a memory device with a double data rate (DDR) interface.

FIG. 4 is a timing diagram of conventional read operations presented to better understand and appreciate operations according to embodiments. FIG. 4 includes the following waveforms: CS is a chip select signal, CA are command and address values, CK_t is a command clock value, DQS can be data strobe (i.e., data clock) signal, and DQ can be a 16-bit bidirectional data bus. FIG. 4 shows signals issued over a memory bus between a MC and a memory device.

At time t0, a first read operation 422A can be started by a MC issuing command and address values on a command-address bus CA. A command-address can be a multi-bit bus. Command and address values can be issued in synchronism with a clock Ck_t (i.e., a rising edge of Ck_t).

At time t1, a second read operation 422B can be started in the same fashion as the first read operation 422A. The time between first read operation 422A and second read operation 422B can be a minimum time period for consecutive read operations for a given burst length (which is a burst length of 16 in this example).

At time t2, a third read operation 422C can be started in the same fashion as the first read operation 422A.

At time t3, following a read latency period, read data 424A corresponding to the first read operation 422A can be driven on data bus DQ. Read data 422A can be output in an uninterrupted burst of 16 values D0 to D15.

At time t4, following a read latency period, which ends at essentially the same time as first burst read data 422A, read data 424B corresponding to the second read operation 422B can be driven on data bus DQ.

Figure 5A:
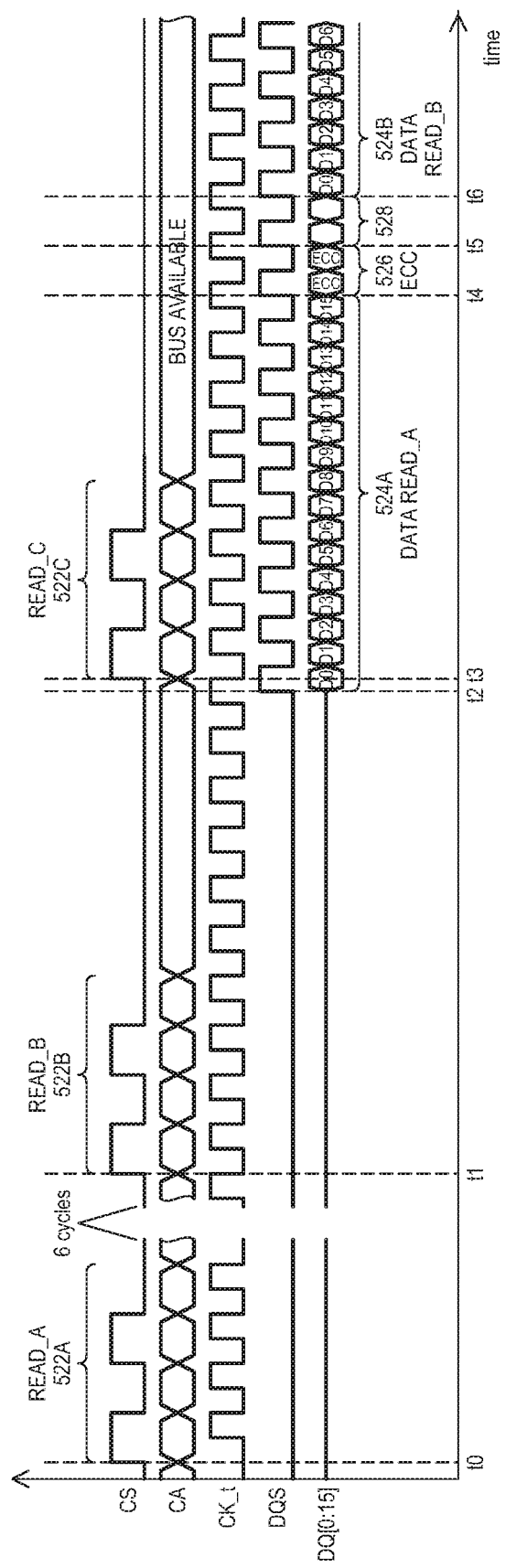
FIG. 5A is a timing diagram showing a read operation that appends error correction code (ECC) values to a read data burst according to an embodiment.

FIG. 5A is a timing diagram of read operations according to an embodiment. In the read operations described, ECC data corresponding to read data can be appended at the end of a read data burst. FIG. 5A includes the same waveforms as FIG. 4.

At time t0, a first read operation 522A can be started by a MC issuing command and address values on a command-address bus CA.

At time t1, a second read operation 522B can be started in the same fashion as the first read operation 522A. The time between first read operation 522A and second read operation 522B can be a minimum time period for consecutive read operations for a given burst length of data, corresponding ECC values, and possibly more values (which is 20 in this example).

At time t3, a third read operation 522C can be started in the same fashion as the first read operation 522A.

At time t2, following a read latency period, read data 524A corresponding to the first read operation 522A can be driven on data bus DQ. Read data 522A can be received in an uninterrupted burst of 16 values D0 to D15. However, unlike a conventional operation, the burst of read data 522A can be followed at time t4 by ECC data 526. In the embodiment shown, the ECC data 526 can be a burst of two. This can provide 8 ECC bits per 64 data bits. However, as shown in FIG. 5A, following the burst of data values and ECC values, starting at time t5 there can be additional data slots 528. Such additional data slots can be used to provide additional ECC or other values.

At time t6, read data 524B corresponding to the second read operation 522B can be driven on data bus DQ. Such read data 524B can be an uninterrupted burst of read data followed with ECC values for such read data.

Figure 5B:
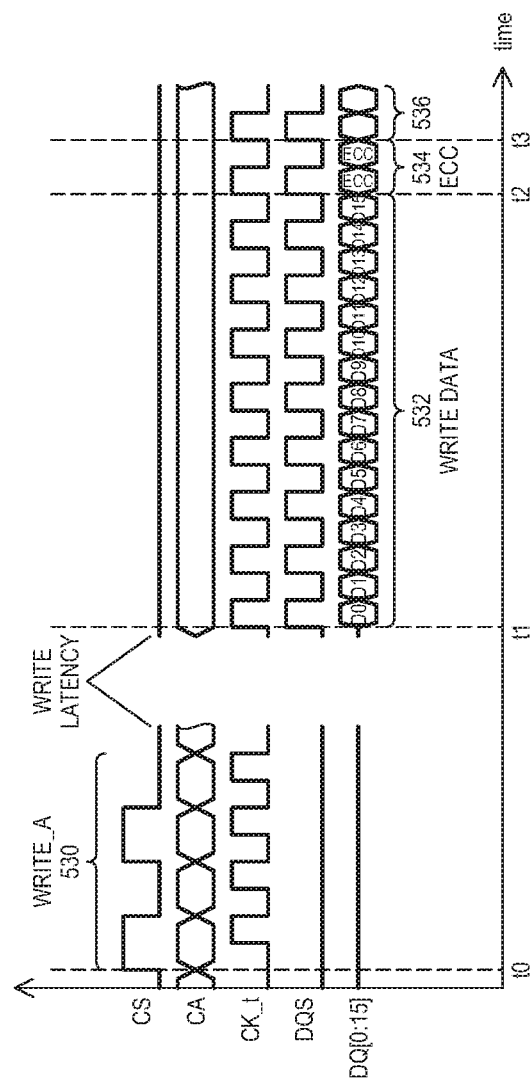
FIG. 5B is a timing diagram showing a write operation that appends ECC values to a write data burst according to an embodiment.

FIG. 5B is a timing diagram of a write operation according to an embodiment. In the write operation described, ECC data corresponding to write data can be appended at the end of a write data burst. FIG. 5B includes the same waveforms as FIG. 5A.

At time t0, a write operation 530 can be started by a MC issuing command and address values on a command-address bus CA.

At time t1, following a write latency period, write data 532 corresponding to the write operation 530 can be driven on data bus DQ by a PHY of a MC. Write data 532 can be received in an uninterrupted burst of 16 values D0 to D15. The burst of write data 532 can be followed at time t2 by ECC data 534. In the embodiment shown, the ECC data 534 can be a burst of two. However, as in the case of FIG. 5A, following the burst of write data values and ECC values, starting at time t3 there can be additional data slots 536. Such additional data slots can be used to provide additional ECC or other values.

Figure 6A:
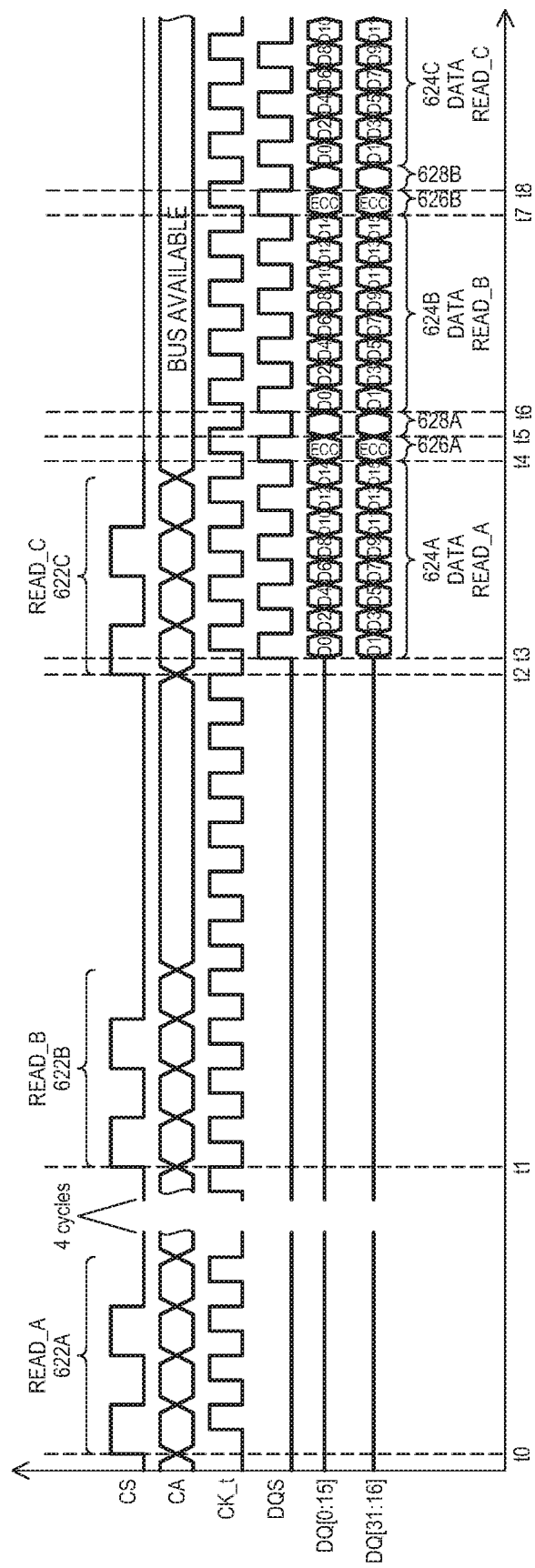
FIG. 6A is a timing diagram showing a read operation that appends ECC values to parallel read data bursts according to an embodiment.

FIG. 6A is a timing diagram of read operations according to another embodiment. In the read operations described, bursts of read data can be received on two different data lanes, or portions of a bus followed by corresponding ECC data. FIG. 6A includes the same waveforms as FIG. 4, but adds an additional data lane or bus portion DQ.

At time t0, a first read operation 622A can be started by a MC issuing command and address values on a command-address bus CA.

At time t1, a second read operation 622B can be started in the same fashion as the first read operation 622A. The time between first read operation 622A and second read operation 622B can be a minimum time period for consecutive read operations for a given burst length of data, corresponding ECC values, and possibly more values (which is 10 in this example).

At time t2, a third read operation 622C can be started in the same fashion as the first read operation 622A.

At time t3, following a read latency period, read data 624A corresponding to the first read operation 622A can be driven on data lanes DQ[0:15] and DQ[31:16]. Read data 622A can be received in uninterrupted bursts of 8 values, with even values (D0, D2, D4, D6, D8, D10, D12, D14) on DQ and odd values (D1, D3, D5, D7, D9, D11, D13, D15) on DQ[16:31]. Each burst of read data 622A can be followed at time t4 by ECC data 626A. In the embodiment shown, the ECC data 626A can be a single 16-bit value on each data lane (DQ[0:15] and DQ[31:16]) for 8 ECC bits per 64 data bits. However, as shown in FIG. 6A, following the burst of data values and ECC values, starting at time t5 there can be an additional data slot 628A. Such an additional data slot can be used to provide additional ECC or other values.

In the embodiment shown, the ECC data 626A can be a single 16-bit value on each data lane (DQ[0:15] and DQ[31:16]) for 8 ECC bits per 64 data bits. However, as shown in FIG. 6A, following the burst of data values and ECC values, starting at time t5 there can be an additional data slot 628A. Such an additional data slot can be used to provide additional ECC or other values.

At time t6, read data 624B corresponding to the second read operation 622B can be driven on data lanes DQ[0:15] and DQ[31:16]. Such read data can have the same organization as that of the first read data 624A. Each data lane can have a burst of eight data values follows by an ECC value (at time t7) and additional ECC or other data (or no data) at time t8.

FIG. 6B is a timing diagram of a write operation according to an embodiment. In the write operation described, ECC data corresponding to write data can be appended at the end of a write data bursts on two different data lanes or portions of a data bus (DQ[0:15] and DQ[31:16]). FIG. 6B includes the same waveforms as FIG. 6A.

At time t0, a write operation 630 can be started by a MC issuing command and address values on a command-address bus CA.

At time t1, following a write latency period, write data 632 corresponding to the write operation 622 can be driven on both of data lanes in uninterrupted bursts of eight, with even values on DQ[0:15] and odd values on DQ[31:16]. The bursts of write data 632 can be followed at time t2 by ECC data 634. In the embodiment shown, the ECC data 634 can be 16 bit values on each data lane (DQ[0:15] and DQ[31:16]). However, as in the case of FIG. 6A, following the burst of write data values and ECC values, starting at time t3 there can be additional an additional data slots 636. Such additional data slots can be used to provide additional ECC or other values.

Figure 7A:
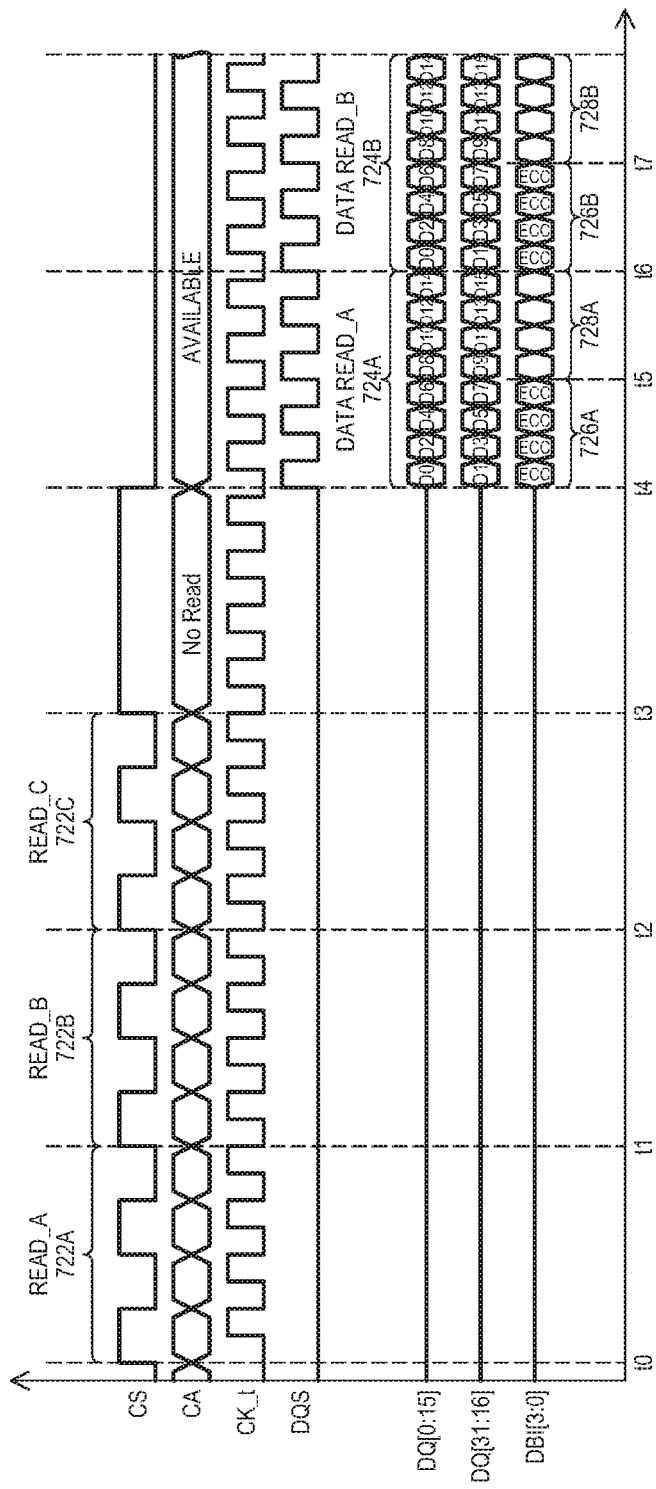
FIG. 7A is a timing diagram showing a read operation that transfers ECC values in parallel with a read data burst on re-tasked, existing input/outputs (I/Os) according to an embodiment.

FIG. 7A is a timing diagram of read operations according to a further embodiment. In the read operations described, bursts of read data can be received on two different data lanes, or portions of a bus. In parallel with such data, corresponding ECC data can be received on re-tasked I/Os. FIG. 7A includes the same waveforms as FIG. 6A, and in addition shows re-tasked I/Os DBI[3:0]. While re-tasked I/Os can be data bus inversion I/Os, in other embodiments, such I/Os can be any suitable I/O, including a data mask I/O as but one example.

At time t0, a first read operation 722A can be started by a MC issuing command and address values on a command-address bus CA.

At time t1, a second read operation 722B can be started in the same fashion as the first read operation 722A.

At time t2, a third read operation 722C can be started in the same fashion as the first read operation 722A.

At time t3, following a read latency period, read data 724A corresponding to the first read operation 722A can be driven on data lanes DQ[0:15] and DQ[31:16] in the same manner as described for FIG. 6A. However, unlike FIG. 6A, ECC data 726A can be received on DBI[3:0] in parallel with read data 724A. In the embodiment shown, ECC data 726A can be a burst of four, 4-bit values for 8 ECC bits per 64 data bits. However, as shown in FIG. 7A, following the burst of ECC values, starting at time t5, there can be an additional data slots 728A. Such additional data slots can be used to provide additional ECC or other values. Further, while FIG. 7A shows ECC data 726 starting at the same time as read data 724A, ECC data could occupy later or non-consecutive slots between times t4 and t6.

At time t6, read data 724B corresponding to the second read operation 722B can be driven on data lanes DQ[0:15] and DQ[31:16]. Such read data can have the same organization as that of the first read data 724A. Further ECC data 726B can have the same organization as ECC data 726B, including additional slots at time t7.

Figure 7B:
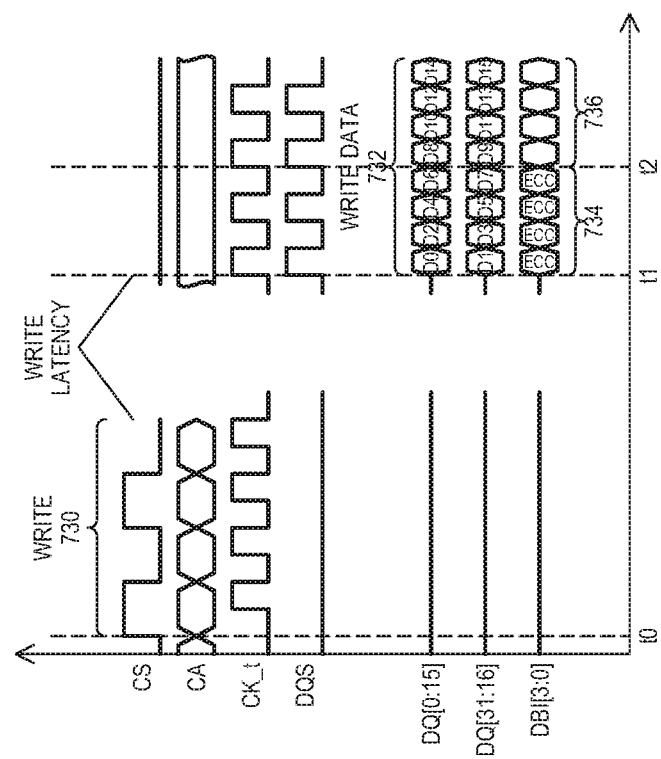
FIG. 7B is a timing diagram showing a write operation that transfers ECC values in parallel with a write data burst on re-tasked, existing I/Os according to an embodiment.

FIG. 7B is a timing diagram of a write operation according to an embodiment. In the write operation described, ECC data corresponding to write data can driven in parallel with write data bursts on re-tasked I/Os. FIG. 7B includes the same waveforms as FIG. 7A.

At time t0, a write operation 730 can be started by a MC issuing command and address values on a command-address bus CA.

At time t1, following a write latency period, write data 732 corresponding to the write operation 722 can be driven on both of data lanes in uninterrupted bursts of eight, with even values on DQ[0:15] and odd values on DQ[31:16]. In parallel with write data 722, ECC values 734 can be driven on re-tasked I/Os. Such ECC values 734 can take the form of those noted for FIG. 7A, or an equivalent, with additional slots being available at time t2.

FIG. 8 is table comparing error-correcting access methods according various embodiments to conventional approaches. Conventional approaches are shown as "Read Data+Read ECC" and "Increase I/O Width×16→×18". In the example of "Read Data+Read ECC", memory accesses can execute a first read operation to retrieve read data values. This can be followed by a second read operation to retrieve corresponding ECC values. In the example of "Increase I/O Width× 16→×18", a memory bus can be increased to enable ECC values to be transmitted in parallel with data values. In this case, from a ×16 bit width to a ×18 bit width.

Column "Append ECC to Read Data" corresponds to an embodiment like that of FIG. 5A or 6A. Column "Repurpose DBI/DM as ECC" corresponds to an embodiment like that of FIG. 7A.

A first compared feature can be bandwidth, assuming a ×16 (or ×18) bus at 800 MHz. A second compared feature (Modify PHY?) can be whether or not the method requires a modification to an existing MC PHY, which can be very costly and complicated. A third compared feature (Modify MC?) can be whether or not the method requires a modification to an existing MC logic, which can be substantially less costly than modifying a PHY. A fourth compared feature (ECC per 256b) is the number of ECC bits that can be provided for each 256b of data. A fifth compared feature can be a memory density.

As shown in FIG. 8, while the conventional approach of "Increase I/O Width×16 →×18" can result in high bandwidths, modification of the PHY is required, which can be undesirable. In contrast, method according to the embodiments provide substantial increases in bandwidth over the conventional "Read Data+Read ECC" case, while requiring a modification to the MC logic and not the PHY.

While embodiments can include systems with multiple components, embodiments can also include memory controllers for enabling data values to be transferred with corresponding ECC data in single read or write transactions.

Figure 9A:
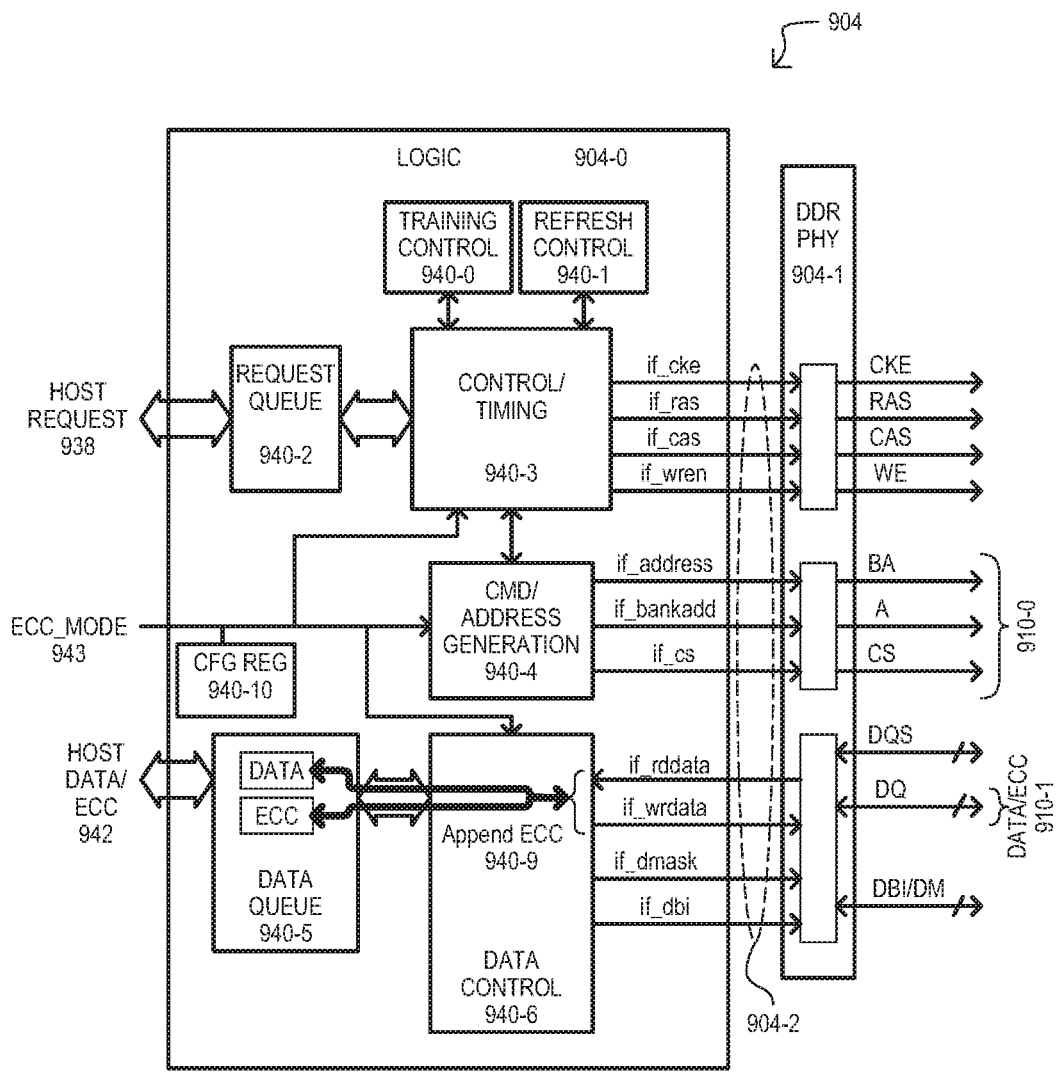
FIG. 9A is a block schematic diagram of a memory controller that appends ECC values to read and/write data bursts according to an embodiment.

FIG. 9A is a block diagram of a MC 904 according to an embodiment. A MC 904 can append ECC data to read and write bursts, as described herein and equivalents. A MC 904 can include a logic portion 904-0 and a PHY portion 904-1. A logic portion 904-0 can include training control 940-0, refresh control 940-1, a request queue 940-2, a control and timing section 940-3, a command/address generator 940-4, a configuration register 940-10, a data queue 940-5, and a data control section 940-6. A training control 940-0 can control training operations for establishing and optimizing links to a memory device. A refresh control circuit 940-1 can control refresh operations in the event a corresponding memory device is a DRAM device. It is understood that some embodiments can include a nonvolatile memory device with a DRAM-like interface. In such cases a refresh control 940-1 can be ignored, not included, or disabled.

A request queue 940-2 can receive and organize requests 938 to access a memory device, such as requests from a host device or the like. In addition, a request queue can provide response values to a requesting device and/or enable response values to be retrieved by a requesting device. Control and timing section 940-3 can control how and when commands and data are issued to a memory device. A command/address generator 940-4 can generate suitable command and address values for accessing a memory device in response to requests 938.

A data queue 940-5 can receive and organize incoming and outgoing data. In the embodiment shown, this can include ECC values for such data. A data queue 940-5 can receive write data values and corresponding ECC values 942 from a host or the like and/or provide read data values and corresponding ECC values 942 to a host or the like.

A data control section 940-6 can organize value received from PHY 904-1 or for transmission by PHY 904-1. Such actions can include appending ECC values to write data values 940-9 for write operations and/or distinguish ECC data as values that follow a burst of read data in read operations.

In some embodiments, MC 904-0 can be configured to operate in a conventional fashion (i.e., do not include ECC data in transactions with a memory device) or in an ECC fashion (i.e., include ECC data in transactions as described herein or equivalents). Such configuration can be established in any suitable fashion. As but one example, MC 904 can switch between such modes in response to a mode value 943. In addition or alternatively, MC 904 can switch between such modes in response to a value stored in a configuration register 940-10.

In the embodiment shown, in response to an ECC mode value (received externally or as set within configuration register 940-10), control and timing section can operate on increased in transaction cycle times arising from the appending of ECC values to data values. In some embodiments, a command/address generator 940-4 can generate a different command code value to distinguish an ECC transaction from a conventional transaction. In addition or alternatively, command/address generator 940-4 can generate a register set command in a memory device (not shown) to increase burst lengths to accommodate appended ECC values. A data control section 940-6 may operate to order ECC values after their corresponding write data value. However, in some embodiments, ECC values may be automatically ordered behind write data values when received from a host device.

Logic section 904-0 can communicate with PHY 904-1 via control signals 904-2. In response to control signals 904-2, PHY 904-1 can generate command and address signals on command address bus 910-0 and receive and transmit data values with appended ECC values on data bus 910-1 as described herein, or equivalents. As understood from FIG. 8, a PHY 904-1 can be a conventional PHY, and not require any modifications to provide the ECC capabilities. In one embodiment, signals 904-2 can be compatible with the DDR PHY Interface (DFI).

In some embodiment, a MC 904 can be hardwired for ECC operations (i.e., not operate conventionally). In which case, MC 904 would not switch modes in response to a mode value.

Figure 9B:
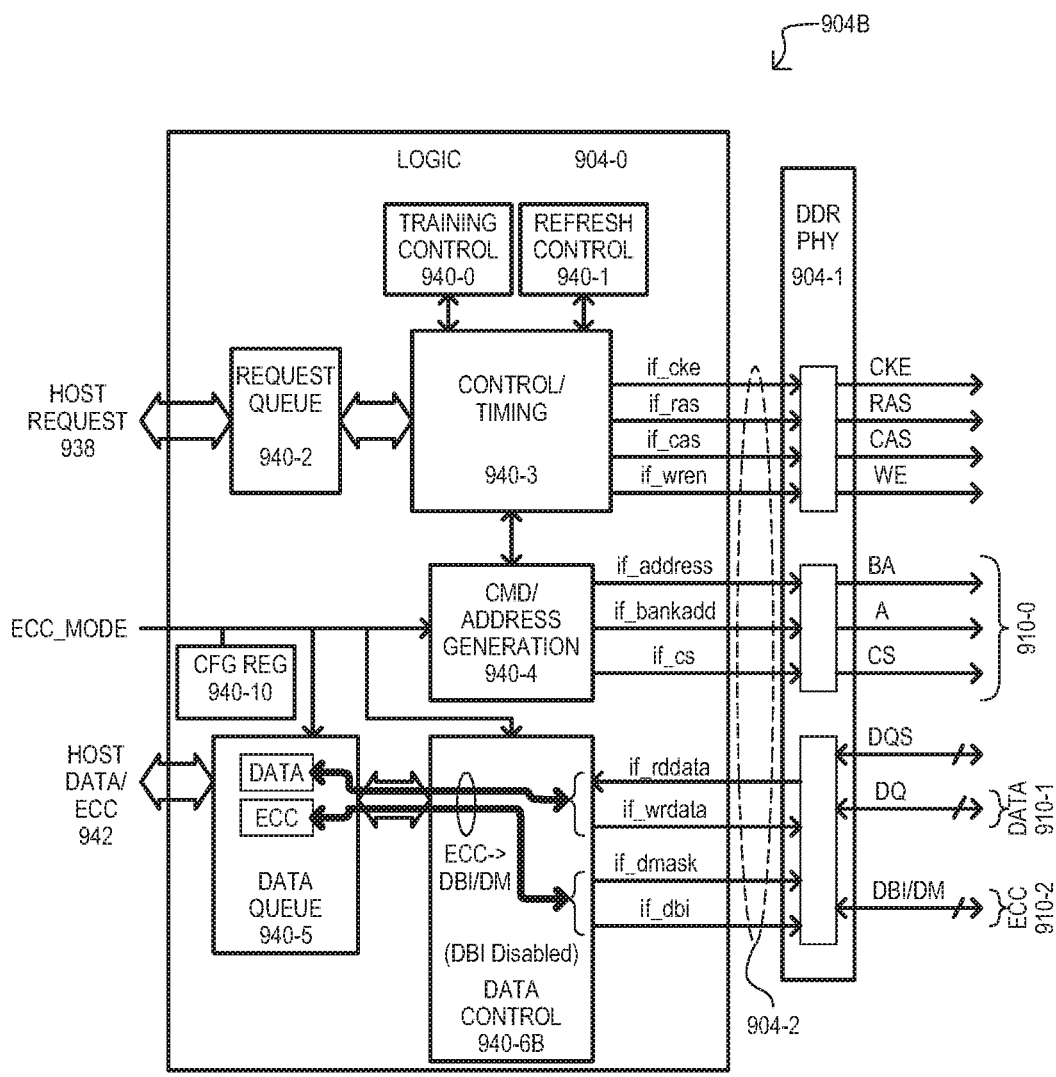
FIG. 9B is a block schematic diagram of a memory controller that transfers ECC values in parallel with read and/write data bursts on re-tasked, existing I/Os, according to an embodiment.

FIG. 9B is a block diagram of a MC 904B according to another embodiment. FIG. 9B can include items like those of FIG. 9A, and such like items can have the structures and be subject to the same variations as noted for FIG. 9A.

FIG. 9B can differ from FIG. 9A in that a data control section 940B can present ECC data as data bus inversion values (if_dbi) or data mask values (if_dmask) to be driven on re-tasked I/Os 910-2 by PHY 904-1. Further, values received on re-tasked I/Os 910-2 can be stored as ECC values. Still further, if data bus inversion I/Os are used for ECC data, data bus inversion operations can be disabled in MC.

FIG. 9B can also differ from FIG. 9A in that command/ address generator 940-3 does not have to take into account extended burst lengths, as ECC values are transmitted in parallel with corresponding data bursts. Further, ECC values are not received on transmitted on data bus 910-1, but rather on re-tasked I/Os 910-2.

Figure 9C:
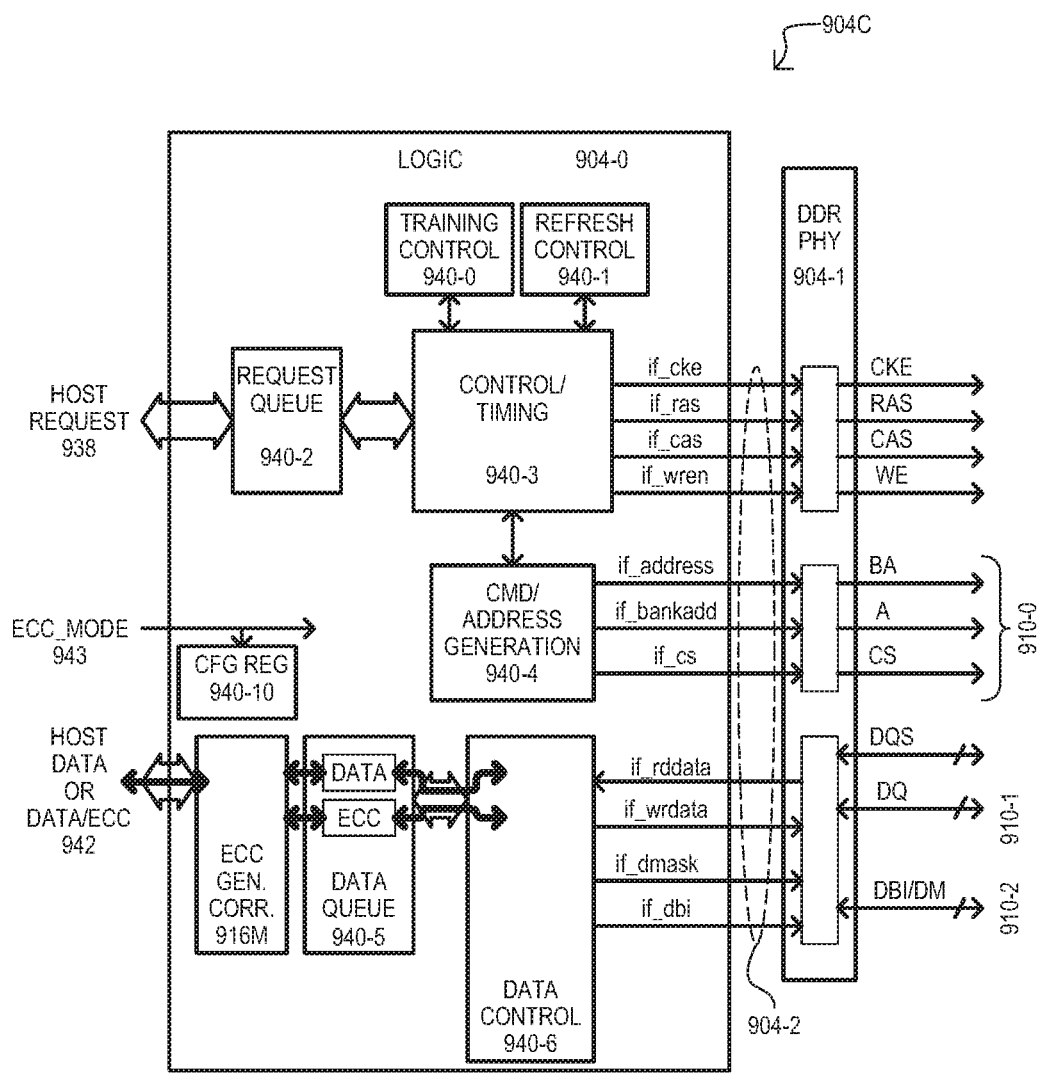
FIG. 9C is a block schematic diagram of a memory controller that includes error detection and correction circuits, according to an embodiment.

FIG. 9C is a block diagram of a MC 904C according to a further embodiment. FIG. 9B can include items like those of FIG. 9A, and such like items can have the structures and be subject to the same variations as noted for FIG. 9A.

FIG. 9C can differ from FIG. 9A in that logic section 904-0 can include an ECC circuit 916M. ECC circuit 916M can perform any of: ECC operations on data and corresponding ECC values received from a host, ECC operations on data and corresponding ECC values received from a memory device or generate ECC values for data received from a host for storage in a memory device. A MC 904C can otherwise operate as in the case of FIG. 9A or 9B, appending ECC data to data bursts and/or transmitting ECC values in parallel with data values over re-tasked I/Os.

While embodiments can include systems and memory controllers, embodiments can also include memory devices for enabling the storage of data values with corresponding ECC data in single read or write transactions.

Figure 10:
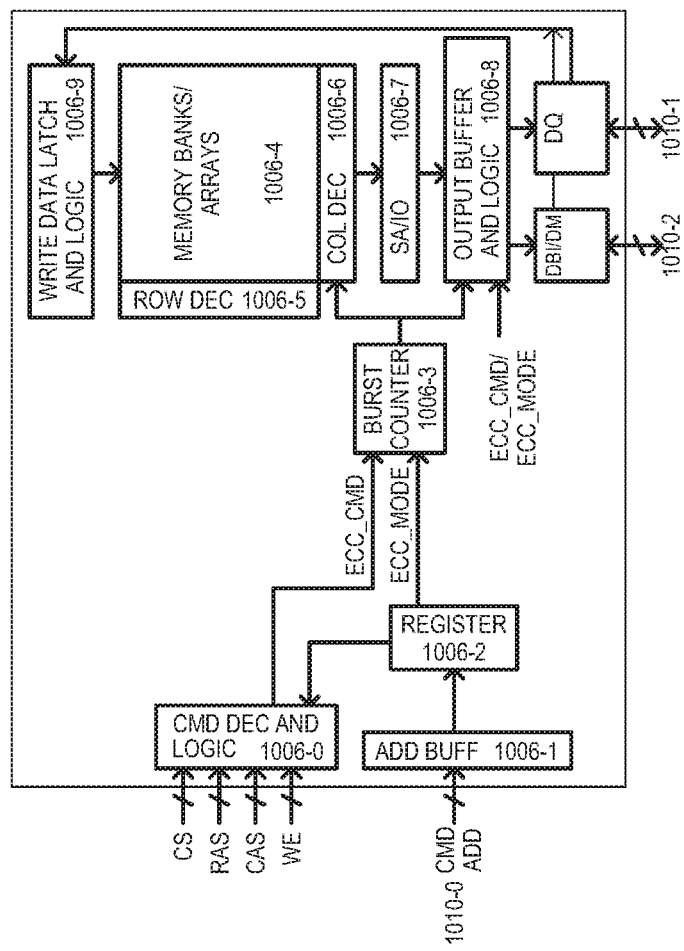
FIG. 10 is a block diagram of a memory device according to an embodiment.

FIG. 10 is a block diagram of a memory device 1006 according to an embodiment. A memory device 1006 can include command decode and logic 1006-0, a command/ address buffer 1006-1, a register 1006-2, a burst counter 1006-3, memory storage locations (e.g., banks or arrays) 1006-4, decoders 1006-5/6, sense amplifiers and I/O circuits 1006-7, output buffer and logic 1006-8, write data latch and logic 1006-9, data I/Os 1010-1, and other I/Os 1010-2. Command decode and logic 1006-0 can execute commands in response to received control signals (CS, RAS, CAS, WE) as well as command values received at command/address buffer 1006-1.

In some embodiments, a memory device 1006 can execute an ECC transaction (i.e., read or write with accompanying ECC values) in response to command values. That is, there can be custom commands for ECC reads and ECC writes. In such cases, in the event ECC data is appended to data values, a value ECC_CMD can be provided to a burst counter 1006-3 to increase burst counts to include the appended ECC values.

In some embodiments, a memory device 1006 can execute an ECC transaction in response to configuration values in register 1006-2. Such configuration values can be written to the register by a memory controller to enable the memory device 1006 to execute ECC functions. For example, in the event ECC data is appended to data values, a value ECC_MODE can be provided to a burst counter 1006-3 to increase burst counts to include the appended ECC values.

In some embodiments, output buffer and logic 1006-8 can be modified by mode or command values (ECC_CMD/ ECC_MODE). For example, in the event ECC data is transferred over re-tasked DBI I/Os, DBI operations can be disabled.

Figure 11A:
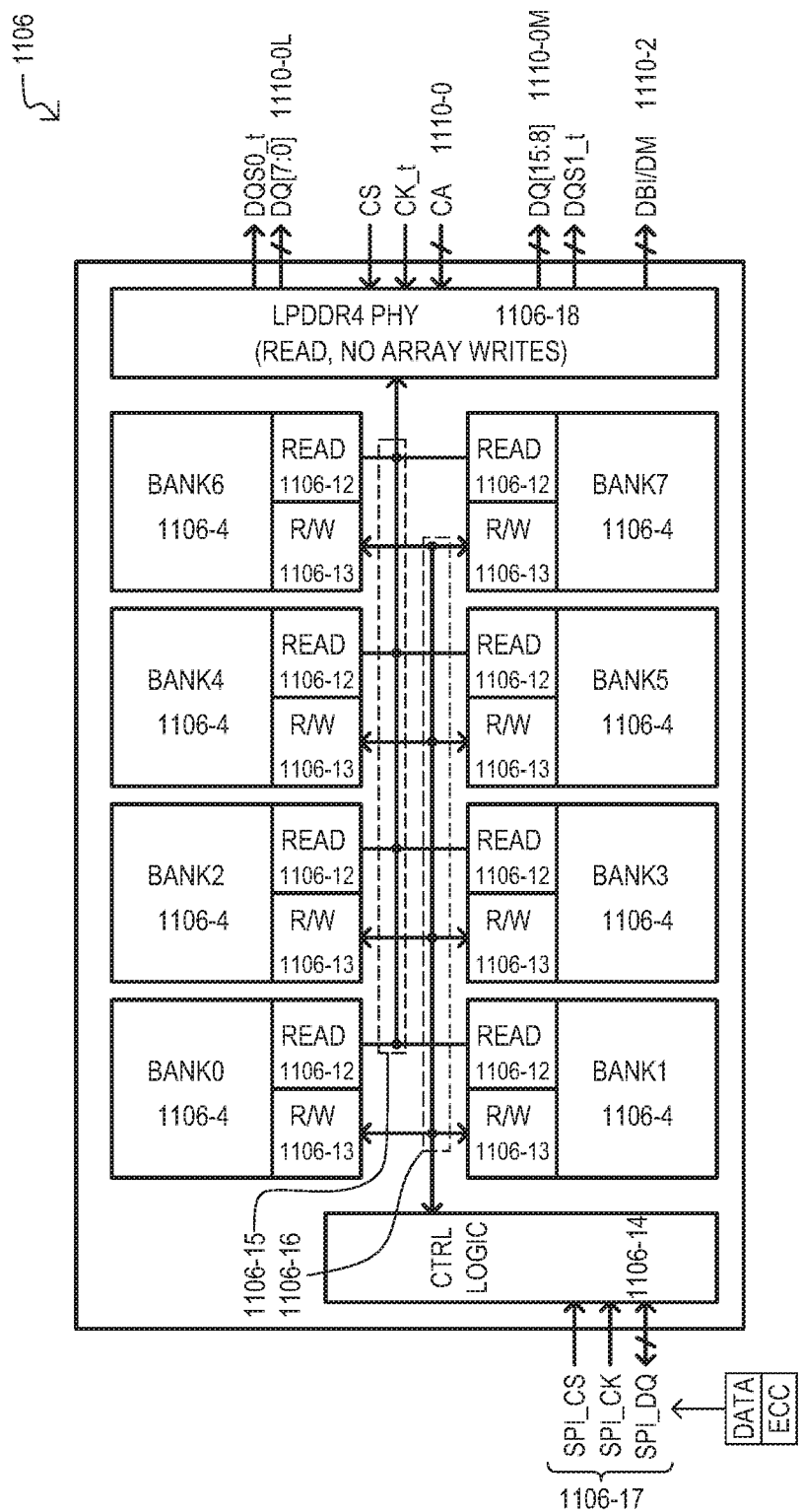
FIG. 11A is a block diagram of a nonvolatile memory device with a DDR interface according to an embodiment.

FIG. 11A is a block diagram of a nonvolatile memory (NVM) device 1106 according to an embodiment. NVM device 1106 can include a LPDDR4 compatible port, that includes data lanes 1110-1L, 1110-1M, command address bus 1110-0, and other I/Os 1110-2. NVM can also include a quad SPI (QSPI) compatible port 1106-17, a LPDDR4 compatible PHY 1106-18, multiple banks 1106-4, a first access path 1106-15, for each bank 1106-4, a second access path 1106-16 each bank 1106-4, and control logic 1106-14.

LPDDR4 PHY 1106-18 can process signals commands received from a MC or like. In some embodiment this can include custom read or write commands for the transmission of write data with ECC values. Such actions can include any of those described herein or equivalents, including but not limited to outputting bursts of read data on data lanes 1110-1L/M followed by corresponding ECC values, receiving bursts of write data on data lanes 1110-1L/M followed by corresponding ECC values, outputting ECC values on re-tasked I/Os 1110-2 in parallel with bursts of read data on data lines 1110-1L/M, and receiving ECC values on re-tasked I/Os 1110-2 in parallel with bursts of write data on data lines 1110-1L/M. However, in some embodiments, write command are not permitted via LPDDR4 PHY 1106-18, only read commands.

QSPI compatible port 1106-17 can include a serial chip select SPI_CS, a serial clock input SPI_CK, and four serial data I/Os SPI_DQ. QSPI PHY can process commands received over port 1106-17, including QSPI compatible commands. Such commands can include both read and write (e.g., program) commands. In some embodiments, such write command can write data values with corresponding ECC values.

Each bank 1106-4 can include NVM cells arranged into rows and columns and can be separately accessible via a unique bank address. In some embodiments, NVM cells can be group erasable (e.g., flash type cells). Read paths 1106-12 can enable read accesses to their corresponding bank 1106-4 from LPDDR4 port 1106-18 via first bus system 1106-15. R/W paths 1106-13 can enable read or write accesses to their corresponding bank 1106-4 from QSPI port 1106-17 via second bus system 1106-16. In some embodiment, different banks 1106-4 can be accessed at the same time from different ports 1106-18/1106-17. However, a same bank 1106-4 may not be accessed at the same time from both ports 1106-18/1106-17.

A control logic 1106-14 can enable ECC accesses to memory device 1106 according to embodiments. For example, in the case of read accesses from LPDDR4 PHY 1106-18, burst lengths can be extended to account for appended ECC values and/or DBI operations can be disabled if ECC values are transmitted over DBI I/Os.

Figure 11B:
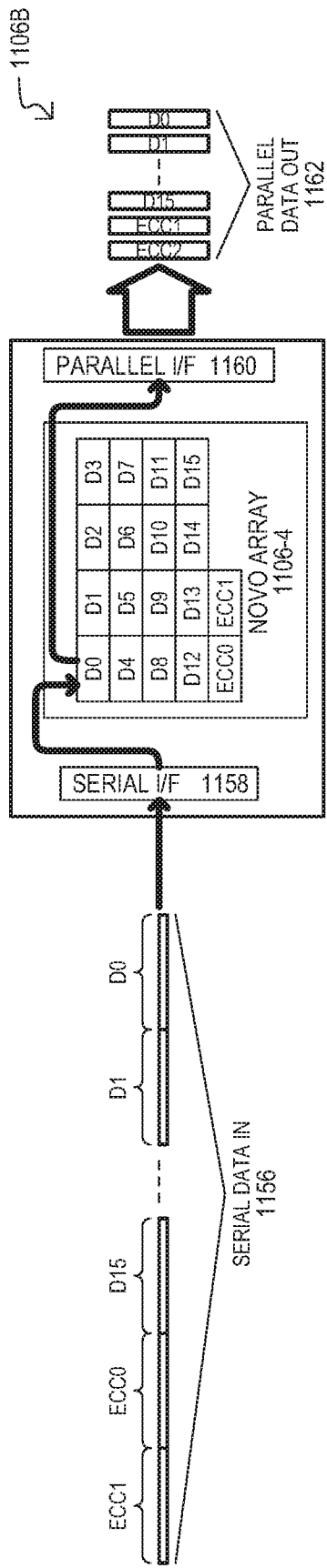
FIGS. 11B and 11C are diagrams showing data and ECC write and read operations according to an embodiment.

FIG. 11B is a diagram showing data read and write operations according to an embodiment. FIG. 11B shows a memory device 1106B having a serial interface 1158, a nonvolatile memory array 1106-4, and a parallel interface 1160. Write (e.g., program) data can be received as "serial data in" 1156. Such serial data can be received over any suitable serial link, including but not limited to: a single serial link, dual serial link, or a quad serial link (e.g., QSPI). Serial data in 1156 can include data values (D0 to D15) and corresponding ECC codes (ECC0/1). Data values (D0 to D15) and ECC codes (ECC0/1) can be stored in nonvolatile memory array 1106-4. ECC codes (ECC0/1) can be stored in predetermined locations, to enable them to be output with data values (D0 to D15).

Data values (D0 to D15) and ECC codes (ECC0/1) can be read out as parallel data values via parallel interface 1160. Such parallel data values can be any suitable number, including but not limited to ×4, ×8, ×16, ×32, ×64. Data values (D0 to D15) are output in an uninterrupted burst, followed by appended ECC codes (ECC0/1).

In some embodiments, a parallel interface 1160 can be a read-only interface. In some embodiments, a memory device 1106B can be one implementation of that shown in FIG. 11A.

Figure 11C:
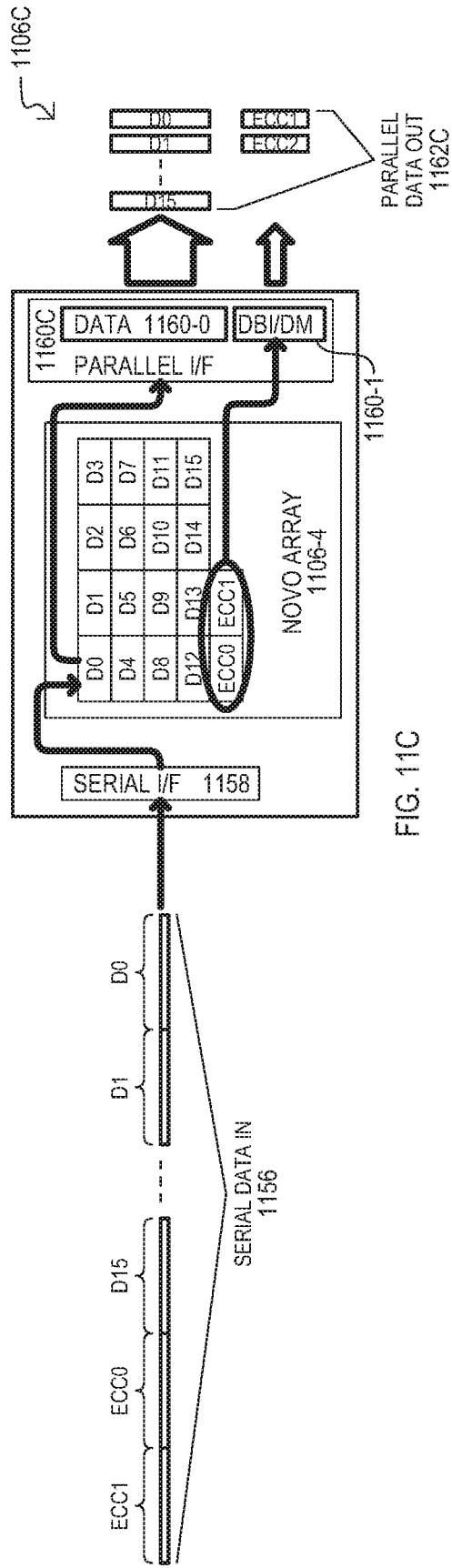

FIG. 11C is a diagram showing data read and write operations according to another embodiment. FIG. 11C shows a memory device 1106C having items like those of FIG. 11B. FIG. 11C can differ in that the parallel interface 1160C can include a data I/O 1160-0 and a data control I/O 1160-1. A data control I/O 1160-1 can be one or more I/Os assigned according to a standard, to input and/or output values that can control how data values are received. For example, data control I/O 1160-1 can include, but is not limited to, DM values that can mask certain portions of bytes, words, doublewords, etc., as well as DBI values that can selectively invert data values. Data values (D0 to D15) and corresponding ECC codes (ECC0/1) can be written (e.g., programmed) into the device as in the case of FIG. 11B.

Data values (D0 to D15) and ECC codes (ECC0/1) can be read out in parallel with one another via parallel interface 1160. Data values (D0 to D15) can be output on data I/O 1160-0, while ECC codes (ECC0/1) can be output on data control I/Os 1160-1.

In some embodiments, a parallel interface 1160C can be a read-only interface. In some embodiments, a memory device 1106C can be one implementation of that shown in FIG. 11A.

FIG. 12 is a flow diagram of a method 1250 according to an embodiment. In some embodiments, a method 1250 can be executed by a MC to access a memory device. A method 1250 can include receiving a memory access request from a host 1250-0. A determination can be made as to whether the access request is an ECC type access 1250-1. If the access is not an ECC type access (N from 1250-1), the request can be executed 1250-2 (e.g., executed in a conventional fashion).

If the access is an ECC type access (Y from 1250-1), if it is a read request (READ from 1250-3), a method 1250 can issue a read command and address 1250-4. In some embodiments, such a read command can be a custom command recognizable by a memory device as an ECC read command. However, in other embodiments a read command can be a conventional read command. After a read latency 1250-5, an uninterrupted burst of read data can be received with corresponding ECC data 1250-6. An uninterrupted burst of read data can be read data values received on consecutive timing slots (e.g. in synchronism with half clock cycles), and the read data values do not include ECC values.

If the ECC type access is a write request (WRITE from 1250-3), a method 1250 can issue a write command and address 1250-4. As in the case of the read operation, a write command can be custom command or a conventional command. After a write latency 1250-8 (if required), an uninterrupted burst of write data can be output with corresponding ECC data 1250-9.

FIG. 13A is a flow diagram of an ECC read method 1350 according to an embodiment. A method 1350 can be an ECC read operation in which ECC data is appended to a read data burst 1350-0. A method 1350 can include establishing a read burst length, ECC burst length and read latency 1350-1. A read command can be issued 1350-2. After the read latency, a burst of read data can be received on data lines 1350-3. ECC data for the read data can be received immediately after the read data burst 1350-4. In some embodiments, immediately after can be the next data slot (e.g., half cycle period) following the last value of the read data burst.

FIG. 13B is a flow diagram of an ECC write method 1352 according to an embodiment. A method 1352 can be an ECC write operation in which ECC data is appended to a write data burst 1352-0. A method 1352 can include establishing a write burst length and ECC burst length 1352-1. A write command can be issued and a burst of write data can be output immediately followed by ECC data for the write data 1352-3.

Figure 14A:
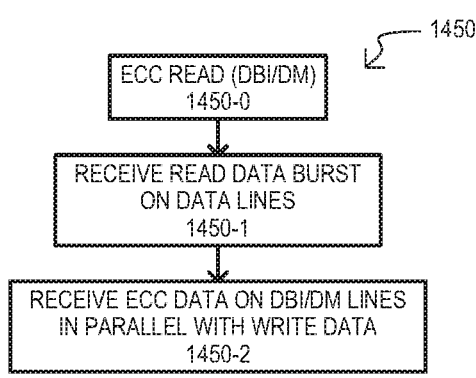
FIGS. 14A and 14B are flow diagrams of read and write methods for transmitting ECC values with data bursts in re-tasked I/Os according to embodiments.

FIG. 14A is a flow diagram of an ECC read method 1450 according to another embodiment. A method 1450 can be an ECC read operation in which ECC data is received in a re-tasked I/O 1450-0. A method 1450 can include receiving a read data burst on data lines 1450-1. The method 1450 can also include receiving corresponding ECC values on re-tasked I/Os (e.g., DBI/DM) in parallel with the burst of read data 1450-2.

Figure 14B:
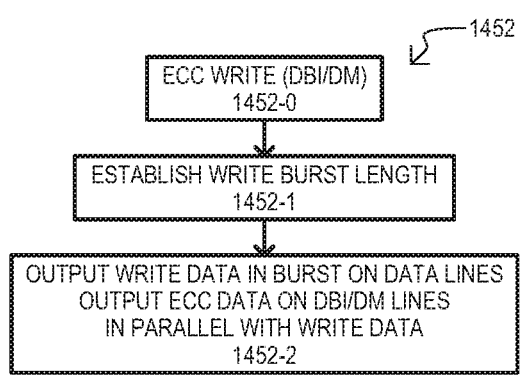

FIG. 14B is a flow diagram of an ECC write method 1452 according to an embodiment. A method 1452 can be an ECC write operation in which ECC data is output on re-tasked I/Os 1452-0. A method 1452 can include establishing a write burst length. Write data can then be output in a burst on data lines. Further, ECC values can be output on re-tasked I/Os in parallel with the write data burst 1452-2.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
   in response to receiving a read request at a memory controller
      sending a read command and address values on a command address bus in synchronism with a clock, and
   in response to the read command,
      receiving an uninterrupted burst of read data values on at least one parallel data bus, the burst of read data values having double date rate with respect to the clock, and
      receiving error correction code (ECC) values for the read data values in response to the same read command, the ECC values being output on non-ECC input/outputs (I/Os); wherein
   the non-ECC I/Os are I/Os assigned according to a preexisting standards organization for non-ECC data.

2. The method of claim 1, wherein the ECC values are received on the at least one parallel data bus after the burst of read data values, and at the double data rate.

3. The method of claim 2, further including:
   receiving a first burst of read data values on a first parallel data bus;
   receiving a second burst of read data values on a second parallel data bus in synchronism with the first burst of read data values;
   receiving first ECC values on the first parallel data bus after the first burst of read data values; and
   receiving second ECC values on the second parallel data bus after the second burst of read data values; wherein the first and second ECC values are ECC values for the first and second burst of read data values.

4. The method of claim 1, wherein the ECC values are received on data control I/Os in parallel with at least some of the read data values.

5. The method of claim 4, wherein data control I/Os are selected from the group of: data mask and data bus inversion I/Os.

6. The method of claim 1, further including:
   the read request is transmitted by a host device;
   transmitting the read data values and corresponding ECC values to the host device; and
   by operation of the host device, executing an error detection and correction operation on the read data values with the corresponding ECC values.

7. The method of claim 6, wherein sending the ECC values for the write data includes sending the ECC values after the burst of write data values on the at least one parallel data bus at the double data rate.

8. The method of claim 6, wherein the ECC values for the write data are sent on data mask or data bus inversion I/Os in parallel with at least some of the write data values.

9. A system, comprising:
   a host device configured to store data in a memory device; and
   a memory controller configured to execute read operations in response to read requests from the host, each read operation including
      sending a read command and read address to the memory device on a command-address bus,
      sending read data from the memory device corresponding to the read command in an uninterrupted burst of read data values on a parallel data bus in synchronism with the rising and falling edges of a data clock signal, and
      sending read error correction code (ECC) values for the read data from the memory device as part of the read command and separate from the burst of read data values; wherein
   the read ECC values are output on a plurality of data control input/outputs (I/Os) in synchronism with the data clock signal.

10. The system of claim 9, wherein the data control I/Os are selected from the group of: data bus inversion I/Os and data mask I/Os.

11. The system of claim 9, further including:
    the memory device is configured to execute write operations in response to write requests, each write operation including
       sending a write command and write address to the memory device,
       receiving write data corresponding to the write command at the memory device, and
       receiving write ECC values for the write data at the memory device.

12. The system of claim 11, wherein:
    the memory device is configured to receive the write data and ECC values via a serial port and output the read data and ECC values via a parallel port.

13. The system of claim 9, wherein:
    the memory controller is configured to execute error detection and correction operation on data and corresponding ECC values received from the host device or the memory device.

14. A device, comprising:
    a memory controller (MC) having
       a logic section that includes a data queue configured to store data values and error correction code (ECC) values corresponding to the data values, a data control section configured to transfer the data values with the corresponding ECC values to a double data rate (DDR) physical layer interface (PHY) section; and the DDR PHY section is configured to transfer the data values in a consecutive burst of data values on a parallel data bus in synchronism with rising and falling edges of a data clock, and transfer the corresponding ECC values with the data values; wherein the data values and corresponding ECC values are transmitted in response to at least a same read or write command; wherein the DDR PHY section is configured to transfer the corresponding ECC values after the data values on the parallel data bus in synchronism with the rising and falling edges of the data clock.

15. The device of claim 14, wherein the DDR PHY is compatible with the LPDDR4 standard.

16. The device of claim 14, wherein the logic section includes ECC circuits selected for the group of: ECC decoding circuits configured to correct errors in the data values with the corresponding ECC values; and ECC generating circuits to generate the ECC values from the data values.

* * * * *